United States Patent Office 3,049,522
Patented Aug. 14, 1962

3,049,522
FORMATION OF BEAD POLYMERS IN PRESENCE OF CATALYST CONTAINING DICYCLOPENTA-DIENYLIRON
Arthur I. Lowell, Plainfield, Joseph J. Latimer, Pittstown, and Alio J. Buselli, New Providence, N.J., assignors to Air Reduction Company, Incorporated, New York, N.Y., a corporation of New York
No Drawing. Filed May 10, 1957, Ser. No. 658,215
7 Claims. (Cl. 260—89.1)

This invention relates to "suspension" or "granular" polymerization of ethylenically unsaturated compounds in an aqueous medium to form beads of polymers of such compounds. By "suspension polymerization' 'is meant that the monomer is maintained in suspension during polymerization, and that the polymers on formation are maintained in suspension in the aqueous medium. The invention also relates to an improved catalyst system for use in effectuating an improved aqueous suspension polymerization technique for ethylenically unsaturated compounds. More specifically, this invention relates to polymerizing ethylenically unsaturated monomers, particularly vinyl acetate, in aqueous suspension at low temperatures with an improved catalyst system including an oil soluble oxidizing agent such, for example, as an organic peroxide catalyst, dicyclopentadienyliron as an oil soluble catalyst promoter and a water soluble reducing agent. The invention also includes the preparation of improved polyvinyl alcohol from polyvinyl acetate beads produced in accordance with the invention.

Polymerization of ethylenically unsaturated compounds is a process of vast commercial importance. For many purposes, it is desirable that the resulting polymers be in the form of beads. Good beads are free of contaminants, of rather uniform size, easily handled, etc. The viscosities of the formed polymers such, for example, as polyvinyl acetate, have been found to be very important characteristics of the materials.

Heretofore, the systems used in polymerizing ethylenically unsaturated monomers are in most instances effective only at elevated temperatures, e.g. 70–100° C. Elevated polymerization temperatures are not always desirable, however, since they tend to result in a highly branched chain polymer rather than the desired relatively linear chain polymer. For example, one of the main difficulties which has been encountered, prior to this invention, in obtaining polyvinyl acetate beads is that the high temperatures employed have resulted in the formation of polyvinyl acetate beads containing a substantial number of branched chains. The disadvantage of such chain branching is that when the polyvinyl acetate is hydrolyzed in the production of polyvinyl alcohol, branched chains are subject to cleavage on hydrolysis resulting in a polyvinyl alcohol having a lower average degree of polymerization than the parent polyvinyl acetate. Accordingly, polyvinyl alcohol formed by hydrolysis of high viscosity polyvinyl acetate containing a high degree of branching, possesses only a medium viscosity due to aforementioned cleavage of the branched chains. By "medium viscosity" as used herein is meant a viscosity in the range from 25 centipoises (cps.) to 80 cps. as measured on a 4% aqueous solution. The term "high viscosity" as used hereinafter means a viscosity in the range of 80 to 300 cps. based on a 4% solution and the term "very high viscosity" means a viscosity of 300 cps. to 500 cps. based on the same measurement.

Efforts have been made to conduct suspension polymerization at lower temperatures to avoid the above-mentioned difficulties. These systems have not been entirely satisfactory, however, mainly because good beads have not resulted or the beads were discolored. For example, polymerizations have heretofore been conducted with oil soluble peroxide catalysts and various promoters, such, for example, as dimethyl aniline at low temperatures. However, these promoters produced products which tended to color the polymer. Discoloration was clearly a problem in these systems for at the low temperature conditions employed a large amount of promoter was required if the reaction was to proceed within a reasonable reaction period.

Accordingly, it is an object of this invention to provide a process for the polymerization of ethylenically unsaturated monomers, particularly vinyl acetate, in aqueous suspension by which it is possible to control branching and degree of polymerization of the resulting polymer, thus producing beads of polymers which are substantially linear in nature. A further object of this invention is to provide a process for the rapid suspension polymerization of ethylenically unsaturated monomers, particularly vinyl acetate, at low temperatures, i.e. 50° C. or less, in a simple and effective manner. Another object of this invention is to provide a process for the polymerization of ethylenically unsaturated monomers, particularly vinyl acetate, in aqueous suspension to produce beads of polymers possessing good bead characteristics. A still further object of this invention is to provide a process for the polymerization of ethylenically unsaturated monomers to produce beads of polymer at low temperatures which are substantially colorless. Yet another object of this invention is to provide polyvinyl alcohol of improved physical characteristics, particularly higher viscosity. A still further object of this invention is to provide an improved catalyst system for realizing the objects set forth above.

In accordance with the present invention an ethylenically unsaturated compound or monomer is polymerized in aqueous suspension at a relatively low temperature with an improved catalyst system including an oil soluble oxidizing agent, dicyclopentadienyliron (known as "ferrocence") which functions as an oil soluble promoter or electron transfer agent, and a water soluble reducing agent. In place of dicyclopentadienyliron, derivatives thereof may be used such as those compounds in which an alkyl group is substituted for hydrogen on the cyclic ring of dicyclopentadienyliron. It has been found that if small amounts of dicyclopentadienyliron are employed with an oil soluble oxidizing agent and a water soluble reducing agent in the suspension polymerization of ethylenically unsaturated monomers in aqueous medium a rapid reaction will occur at low temperatures in the monomer droplet phase and polymers of linear structure and good bead characteristics are obtained. The term "low temperature" as used herein means a temperature from about 50° C. to a temperature below which the rate of thermal decomposition of the oil soluble oxidizing agent is so slow as not to be useful for initiating polymerization of the free radical type. In general, the polymerization is conducted at a temperature in the range of 10° C. to 50° C. and, preferably 25° C. to 30° C.

Although the invention in particular relates to the polymerization of vinyl acetate, any ethylenically unsaturated monomer capable of being polymerized by a free radical mechanism may be used. The present process is particularly applicable to polymerizable compounds which contain the $CH_2=C<$ group. In addition to vinyl acetate, examples of other monomers which are suitably polymerized by the present process are acrylyl and alkacrylyl compounds, e.g. acrylonitrile, ethyl acrylate, acrylic acid, methyl methacrylate and methacrylic acid; vinyl and vinylidene halides, e.g. vinyl chloride and vinylidene chloride; vinyl carboxylates, e.g. the preferred vinyl acetate and vinyl stearate; vinyl aromatics, e.g. styrene; and other vinyl derivatives. It should be understood that the present process is applicable to the polymerization of two different monomers, i.e. copolymerization such, for example, as the copolymerization of vinyl acetate and dibutyl maleate or vinyl acetate and crotonic acid.

As indicated heretofore, the polymers of this invention are formed by the well-known suspension technique of polymerization. In carrying out the suspension polymerization in accordance with this invention, the ethylenically unsaturated monomer is dispersed as small globules by mechanical agitation in water. Circulation and agitation of the aqueous medium may be conducted by operation of a conventional stirrer and further preferably by the admission of an inert gas such as nitrogen. Bubbling nitrogen through the aqueous dispersion not only assists in dispersing the monomer droplets but also serves to deaerate it to prevent inhibition of the polymerization reaction by the oxygen of the air.

The globules are maintained in suspended condition during the progress of the polymerization by stirring and a dispersant in the aqueous medium. The dispersant also serves in preventing agglomeration of the globules during the polymerization reaction. A particularly useful dispersant for vinyl acetate is a polyvinyl alcohol manufactured by Colton Chemical Company, a division of Air Reduction Company, Inc., and sold under the trade name "Vinol PA-40." Examples of other compounds suitable as dispersant in the present process are gelatin pectin, methyl cellulose, alginates, starch, bentonite and the like. In general, the proportion or concentration of dispersant required in the aqueous suspension medium will be very small, e.g. .005% to 0.2% by weight of the combined weight of monomer and water.

As indicated hereinbefore, the catalyst system used in accordance with this invention includes an oil soluble oxidizing agent, as a polymerization initiator, dicyclopentadienyliron and a water soluble reducing agent. Dicyclopentadienyliron is insoluble in water but soluble in organic solvents such as benzene, aliphatic hydrocarbons, alcohols and the like. This compound is described in detail in U.S. Patent No. 2,680,756. By the term "oil soluble oxidizing agent" is mean a polymerization initiator of the type yielding free radicals that is soluble in the polymerizable material and is also preferably insoluble in the aqueous medium. Such oxidizing agents are the peroxide type materials such, for example, as benzoyl peroxide. The preferred oxidizing agents are the organic peroxides such as may be represented by the formula ROOR, where R may be an alkyl, aryl, acyl, aralkyl, or cycloalkyl group. More particularly, the preferred oil soluble oxidizing agents include benzoyl peroxide, lauroyl peroxide, ditertiary butyl peroxide, acetyl peroxide, o-chlorobenzoyl peroxide, totyl peroxide, acetyl benzoyl peroxide, and the like.

The catalyst system of this invention includes a water soluble reducing agent whereby a "redox" type of catalyst system is provided. It has been found that if a water soluble reducing agent such, for example, as sodium formaldehyde sulfoxylate, is included in the reaction medium, a very low amount of dicyclopentadienyliron can be used in effectuating the desired reaction. It is unexpected that a water soluble reducing agent would be so effective in a catalyst system employing an oil soluble oxidizing catalyst for generally an oil soluble reducing agent is employed with such catalyst in a "redox" system. Although this invention is not limited to any theory of action, it appears that the dicyclopentadienyliron activates or promotes the oil soluble oxidizing agent at low temperatures probably by one electron transfer. The oxidized form of dicyclopentadienyliron (ferrocinium ion) is water soluble and readily reduced back to dicyclopentadienyliron by the water soluble reducing agent. Only trace amounts of dicyclopentadienyliron such, for example, as 0.005% based on total weight of monomer and water, are needed to activate the oil soluble reducing agent, such, for example, as bonzoyl peroxide at a practical rate if a reducing agent such, for example, as sodium formaldehyde sulfoxylate is present. Although dicyclopentadienyliron and its oxidized form are highly colored, so little is required that it imparts practically no color to the polymer beads. In any event the physical properties of dicyclopentadienyliron and its oxidized form make their removal easy during subsequent processing (steam volatility and solubility) and a colorless polyvinyl acetate can be obtained which, in turn, will provide a colorless polyvinyl alcohol when converted by hydrolysis.

Examples of additional water soluble reducing agents which may be used are the sodium salt of p-toluene sulfinic acid, chlorobenzene sulfinic acid, zinc formaldehyde sulfoxylate, sodium bisulfite and sodium thiosulfate.

The process of this invention is carried out in a conventional polymerization kettle provided with a stirrer, nitrogen inlet, thermometer, condenser, cooling bath and provision for steam distillation. In using the above referred to apparatus, monomer, water and a small amount of a dispersant are fed to the kettle and stirred by means of the stirrer. The stirrer serves two purposes. One, it mechanically breaks up the monomer into globules which are dispersed in the water, and secondly, it creates agitation or turbulence in the reaction vessel which helps in suspending the globules during polymerization. The presence of a dispersant assists in preventing undesirable agglomeration of the globules.

After the stirring is initiated, it is preferred that a slow stream of an inert gas such, for example, as nitrogen, be bubbled through the aqueous dispersion at a low temperature, e.g. 30° C. As indicated heretofore bubbling of nitrogen through the aqueous dispersion not only assists in dispersing the monomer droplets but also serves to deaerate to obviate inhibition of the polymerization reaction by the air. Agitation by means of stirring and the stream of nitrogen is maintained during the entire reaction.

After the monomer has been adequately dispersed in the aqueous medium, the catalyst system components are added to the aqueous suspension. Preferably, the catalyst promoter, oil soluble oxidizing agent and the water soluble reducing agent are added separately to the aqueous dispersion and in the above indicated order. Preferably, the catalyst promoter dicyclopentadienyliron is added in the form of monomer solution, e.g. a 1% solution of dicyclopentadienyliron in vinyl acetate and likewise for the oil soluble oxidizing agent, e.g. 2% solution of benzoyl peroxide in vinyl acetate. Preferably, the reducing agent is added in the form of an aqueous solution, such, for example, as a 2% aqueous solution of sodium formaldehyde sulfoxylate.

Within a short time, e.g. one hour, a noticeable temperature rise occurs. The reaction is cooled so that the temperature remains relatively low, e.g. 30° C. The reaction is allowed to proceed making the cooling adjustment to maintain the desired temperature until the reaction is complete as indicated by a drop in temperature. At this point a small amount of a polymerization inhibitor may be added and the mixture stripped of monomer if necessary. The formed beads of polymer are separated, washed and dried.

The viscosity of the beads of polymer is measured as a molar benzene viscosity. The beads may then be converted to polyvinyl alcohol by hydrolysis in any conventional manner such, for example, as by methanolysis thereof using a small amount of sodium hydroxide or sodium methoxide as the catalyst. The following is representative of a conventional methanolysis procedure that may be employed:

80 grams of polyvinyl acetate is dissolved in 400 ml. of methanol. A solution of 4 grams of NaOH in 400 ml. methanol is made up. The polyvinyl acetate solution is slowly added to the NaOH solution over three hours at room temperature. The mixture is stirred overnight and the polyvinyl alcohol is filtered, washed with methanol and neutralized with acetic acid.

Examples are now given hereinbelow for the preparation of specific polyvinyl acetate beads and polyvinyl alcohol in accordance with the present invention employing the general procedure outlined above.

EXAMPLE I

This example illustrates the preparation of polyvinyl acetate beads by suspension polymerization in accordance with this invention and conversion of said polymer beads to high viscosity polyvinyl alcohol.

The following materials were placed in the resin kettle:

300 g. of vinyl acetate (HQ inhibited)
300 g. of distilled water
4 ml. of 5% aq. "Vinol PA–40"

Stirring was started. A slow stream of nitrogen was bubbled through the mixture at 30° C. These conditions were maintained during the entire reaction. After thirty minutes, the catalyst system components were added in the noted order:

3 ml. of a 1% solution of dicyclopentadienyliron in vinyl acetate
7.5 ml. of a 2% solution of benzoyl peroxide in vinyl acetate
6.5 ml. of a 2% solution of sodium formaldehyde sulfoxylate Within one hour, a noticeable temperature rise occurred. The reaction was cooled so that the temperature did not go above 30° C. and was preferably maintained below 30° C. Within five and one-half hours, the reaction was complete as indicated by a drop in temperature. No monomer odor was noted. The beads were separated, washed and dried. Conversion based on recovered monomer polymer was 97%. The product had a faint yellow cast. The overall time cycle exclusive of drying of the beads was less than eight hours.

The molar benzene viscosity of the beads was 1200 c.p.s. Methanolysis of this material using a small amount of sodium hydroxide as the catalyst gave a colorless polyvinyl alcohol. A 4% aq. solution of this material had a viscosity of 290 cps.

EXAMPLE II

This example illustrates the preparation of polyvinyl acetate beads by suspension polymerization in accordance with this invention and conversion of said polymer beads to polyvinyl alcohol of very high viscosity.

The following materials were charged into the reactor:

300 g. of vinyl acetate (HQ inhibited)
300 g. of distilled water
4 ml. of 5% aq. "Vinol PA–40"

Stirring was started and a slow stream of nitrogen was passed through the mixture. The mixture was heated slightly to 30° C. These conditions were maintained during the remainder of the reaction. After one-half hour, the catalyst components were added:

3 ml. of a 1% solution of dicyclopentadienyliron in vinyl acetate
5 ml. of a 2% solution of benzoyl peroxide in vinyl acetate
5 ml. of a 2% aq. solution of sodium formaldehyde sulfoxylate Within one hour, there was a temperature rise. The reaction showed signs of dying out after five hours. At no time during the reaction was the temperature allowed to go above 30° C. and most of the time it was less than 30° C.

Hydroquinone (0.1 g.) was added and the remaining monomer was removed by steam distillation. The mixture was cooled and stirred. Good beads were obtained which were washed and dried. Conversion was 68% based on monomer, 65% on polymer recovery. The product had a faint tan cast.

The molar benzene viscosity of the beads was 650 cps. Basic methanolysis gave a colorless polyvinyl alcohol with a 4% aq. solution viscosity of 620 cps.

EXAMPLE III

This example illustrates the preparation of polyvinyl acetate beads by suspension polymerization in accordance with this invention and conversion of said polymer beads to polyvinyl alcohol of medium viscosity.

The following materials were charged into the reactor:

300 g. of vinyl acetate (HQ inhibited)
300 g. of distilled water
3 ml. of a 1% solution of dicyclopentadienyliron in vinyl acetate
4 ml. of 5% aq. "Vinol PA–40"
0.27 g. of benzoyl peroxide
0.09 g. of sodium formaldehyde sulfoxylate The mixture was stirred and the temperature was adjusted to 30° C. A slow stream of nitrogen was passed through the mixture. These conditions were maintained for the remainder of the polymerization. After one hour there was a temperature rise. The mixture was stirred for another six hours maintaining the temperature at 30° C. The mixture was steam distilled at the end of this time. No monomer was recovered. Polymer recovery indicated 99% conversion after the beads were cooled, separated, washed and dried.

The molar benzene viscosity of the polymer was 227 cps. Basic methanolysis gave a colorless polyvinyl alcohol with a 4% aq. solution viscosity of 79 cps.

EXAMPLES IV–XVII

Fourteen additional examples of polyvinyl acetate beads and polyvinyl alcohols were prepared in the same manner described in Examples 1–3. A Table I of results relating to these examples is shown hereinbelow. The results of Examples 1–3 are also included in this table.

Table I

| Experiment No. | Example | Size of Charge, grams | Percent Monomer | Percent PA-40 | Dicyclopentadienyliron, percent | Percent Bz₂O₂ | Percent SFS | Stoichiometric Ratio of SFS:Bz₂O₂ | Max. Reaction Temp. | Percent Conversion based on Recov. Polymer | Reaction Time, hours | Acetate Molar Benzene Viscosity | 4% aq. PVA Viscosity |
|---|---|---|---|---|---|---|---|---|---|---|---|---|---|
| 994-105 | I | 600 | 50 | 0.033 | 0.005 | 0.025 | 0.022 | 4.0 | 30 | 99 | 5.5 | 1,200 | 290 |
| 994-110 | II | 600 | 50 | 0.033 | 0.005 | 0.016 | 0.016 | 4.0 | 30 | 65 | 5.5 | 650 | 620 |
| 975-114 | III | 600 | 50 | 0.033 | 0.005 | 0.045 | 0.015 | 1.0 | 30 | 99 | 6 | 227 | 79 |
| 994-66 | IV | 600 | 50 | 0.033 | 0.005 | 0.035 | 0.05 | 5.6 | 38 | 85 | 3 | 824 | 280 |
| 994-69 | V | 600 | 50 | 0.033 | 0.005 | 0.035 | 0.035 | 4.0 | 40 | 90 | 2.3 | 1,270 | 205 |
| 994-71 | VI | 600 | 50 | 0.033 | 0.005 | 0.025 | 0.025 | 4.0 | 33 | 97 | 4 | 1,600 | 210 |
| 994-72 | VII | 600 | 50 | 0.033 | 0.005 | 0.016 | 0.016 | 4.0 | 30 | 71 | 4.8 | 820 | 440 |
| 994-75 | VIII | ¹18 | 50 | 0.033 | 0.005 | 0.035 | 0.07 | 8.0 | 33 | 95 | 3.5 | 2,000 | 200 |
| 994-91 | IX | 600 | 50 | 0.033 | 0.005 | 0.034 | 0.01 | 1.3 | 37 | 98 | 4.3 | 400 | 90 |
| 994-92 | X | 600 | 50 | 0.033 | 0.005 | 0.034 | 0.01 | 1.3 | 35 | 73 | 5 | 285 | 110 |
| 994-93 | XI | 600 | 50 | 0.033 | 0.005 | 0.1 | 0.025 | 1.0 | 42 | 99 | 5.5 | 180 | 45 |
| 994-95 | XII | 600 | 50 | 0.033 | 0.005 | 0.025 | 0.03 | 4.8 | 38 | 70 | 4 | 650 | 240 |
| 994-96 | XIII | 600 | 50 | 0.033 | 0.005 | 0.037 | 0.025 | 2.7 | 42 | 98 | 5 | 900 | 100 |
| 994-97 | XIV | 600 | 50 | 0.033 | 0.005 | 0.09 | 0.025 | 1.1 | 38 | 96 | 5.5 | 250 | 45 |
| 994-106 | XV | 600 | 50 | 0.033 | 0.005 | 0.045 | 0.015 | 1.0 | 31 | 93 | 5 | 400 | 100 |
| 994-133B | XVI | 600 | 50 | 0.033 | 0.005 | 0.016 | 0.016 | 4.0 | 30 | 62 | 5 | 650 | 370 |
| 994-133A | XVII | 600 | 50 | 0.033 | 0.005 | 0.016 | 0.016 | 4.0 | 30 | 70 | 4.5 | 1,000 | 640 |

All percents refer to weight percents based on total weight of water-vinyl acetate mixture.
¹ Kilograms.

In the examples summarized in above Table I, a maximum of 0.10 wt. percent of benzoyl peroxide and 0.07 wt. percent of sodium formaldehyde sulfoxylate was used based on a 1:1 mixture by weight of vinyl acetate and water. Only 0.005% of cyclopentadienyliron was used in all of the examples. In most cases the amount of peroxide and reducing agent were much less than the maximum.

It can be seen from the table of results that generally at the 0.025–0.03 wt. percent level of benzoyl peroxide with a 4-fold stoichiometric excess of the reducing agent, the reaction went to completion to give 1200–1600 cps. polyvinyl acetate (molar benzene viscosity). The derived polyvinyl alcohol had a 4% aq. solution viscosity of 200–290 cps.

Reducing the benzoyl peroxide concentration to 0.016 wt. percent and keeping a 4-fold stoichiometric excess of reducing agent gave a reaction which only went to 65% conversion based on recovered polymer in the best run. The product had a viscosity of 650 cps. (molar benzene); the derived polyvinyl alcohol had a viscosity of 620 cps. (4% aq. solution). In this case the effect of a lower conversion can be seen.

In addition to the low peroxide levels used in the above examples, the excess reducing agent probably consumed peroxide in a side reaction which further lowered the amount of peroxide available for initiation and thereby increased the degree of polymerization.

For conventional viscosity polyvinyl alcohol, high peroxide concentrations, e.g. 0.035% to 0.1% and the stoichiometrically equivalent amounts of reducing agent were used. Use of these peroxide and reducing agent amounts resulted in an increase in the number of initiating catalyst radicals and in a decrease in the degree of polymerization of the polymer which was formed. Between 0.035–0.1 wt. percent of benzoyl peroxide its rate of activation was fast enough to give a useful rate of polymerization yet slow enough so that no apparent side reactions occurred which decreased the number of initiating radicals. With 0.045 wt. percent of peroxide, the polymerization went to completion to give beads with a viscosity of 227 cps. and a derived polyvinyl alcohol of 79 cps. (4% aq. solution viscosity).

From the results of Table I it is seen that good polyvinyl acetate beads may be obtained in accordance with this invention with only a small amount of oil soluble oxidizing agent promoted by a trace of dicyclopentadienyliron. The water soluble reducing agent need only be present in a very small amount which varies depending upon the amount of oxiding agent present and the type polymer desired. Of course, water need be present only in an amount to function as a vehicle in providing the aqueous dispersion of the monomer. In general, for every 100 parts of monomer, the oil soluble oxidizing agent is in an amount from 0.01 to 1.0 part and, preferably 0.03 to 0.2 part; the dicyclopentadienyliron promotor is in an amount from 0.005 to 0.10 part and, preferably 0.01 to 0.02 part; the reducing agent is in an amount from 0.005 to 1.0 part, and preferably from 0.02 to 0.15, and water is in an amount from 30 to 800 parts and, preferably 80 to 120 parts.

The following Examples XVIII–XX show the criticality of the catalyst promotor and water soluble reducing agent in the catalyst system of the present invention. These examples relate to suspension polymerization of vinyl acetate. In Example XVIII the catalyst system consists solely of an oil soluble oxidizing agent, i.e., benzoyl peroxide. The catalyst system of Example XIX also includes benzoyl peroxide plus a water soluble reducing agent, namely, sodium formaldehyde sulfoxylate. In Example XX the catalyst system consists of benzoyl peroxide and the catalyst promoter dicyclopentadienyliron. The apparatus used and procedure followed in the following examples were the same as those described in Example I.

EXAMPLE XVIII

The following materials were added to the polymerization kettle:

Vinyl acetate _____ g__ 300
Distilled water _____ g__ 300
5% aq. solution of PA-40 _____ ml__ 4

The above mixture was stirred. A slow stream of nitrogen was bubbled through at 30° C. After one-half hour 5 ml. of benzoyl peroxide 2% in vinyl acetate (0.033% by wt. of combined weight of water and vinyl acetate) was added to the aqueous dispersion. Six hours later 0.1 g. of hydroquinone was added and the contents steam distilled. There was a 100% recovery of monomers with no polymer being recovered.

In the six hour period above after the benzoyl peroxide was added, the cooling bath temperature was 26° C. to 28° C. and the reaction temperature 26° C. to 30° C.

EXAMPLE XIX

The following materials were added to the polymerization kettle:

Vinyl acetate _____ g__ 300
Distilled water _____ g__ 300
5% aqueous sol. of PA-40 _____ ml__ 4

The above mixture was stirred. A slow stream of nitrogen was bubbled through at 30° C. After one-half hour the following ingredients were added:

5 ml. of 2% solution of benzoyl peroxide in vinyl acetate
5 ml. of 2% solution of sodium formaldehyde in water The concentrations of the above oxidizing agent and reducing agent were 0.033% based on the combined weight of water and monomer.

Six hours later 0.1 g. hydroquinone was added and the contents steam distilled. The monomer recovery was 99% and polymer recovery 0.6%.

In the above six hour period after the oxidizing agent and reducing agent were added, the cooling bath temperature was 26° C. to 28° C. and the reaction temperature was 26° C. to 30° C.

EXAMPLE XX 300 grams of vinyl acetate, 300 grams of distilled water, and 4 ml. of 5% aqueous PA-40 were added to a kettle. 3.75 ml. of 2% benzoyl peroxide in vinyl acetate were added. Over a period of five hours, 1 ml. portions of 1% dicyclopentadienyliron in vinyl acetate were added to the above mixture at one-half hour intervals for a total of 10 ml. of dicyclopentadienyliron solution. The mixture was continuously agitated and maintained at about 30° C. A blue color developed indicating oxidation of the dicyclopentadienyliron by the benzoyl peroxide. One hour after the final dicyclopentadienyliron addition, hydroquinone was added to stop the reaction. The mixture was steam distilled and 98% monomer was recovered. There was a 2% conversion to the polymer.

The invention in its broader aspects is not limited to the specific steps, methods, compositions and improvements described but departures may be made therefrom within the scope of the accompanying claims without departing from the principles of the invention and without sacrificing its chief advantages.

What is claimed is:

1. A process for preparing a polymerized ethylenically unsaturated monomer in bead form which comprises admixing an ethylenically unsaturated monomer, water in an amount of 30–800 parts per 100 parts of monomer, a dispersing agent in an amount of 0.005–0.2% by weight of monomer and water, and a catalyst system including 0.005–0.1 part of dicyclopentadienyliron per 100 parts of monomer, 0.01–1.0 part of an organic peroxide per 100 parts of monomer, and 0.005–1.0 part of a water-soluble reducing agent selected from the group consisting of sodium formaldehyde sulfoxylate, sodium salt of p-toluene sulfinic acid, chlorobenzene sulfinic acid, zinc formaldehyde sulfoxylate, sodium bisulfite and sodium thiosulfate per 100 parts of monomer and agitating the resulting mixture to polymerize the monomer, maintaining the polymerization temperature below 50° C. during the progress of the polymerization in the formation of polymer beads, and recovering the resulting beads of polymerized ethylenically unsaturated monomer.

2. A process according to claim 1, wherein the organic peroxide in benzoyl peroxide.

3. A process according to claim 1, wherein the water-soluble reducing agent is sodium formaldehyde sulfoxylate.

4. A process for preparing polyvinyl acetate in bead form which comprises admixing vinyl acetate, water, a dispersing agent and a catalyst system including dicyclopentadienyliron as a catalyst promoter, an organic peroxide, and a water-soluble reducing agent selected from the group consisting of sodium formaldehyde sulfoxylate, sodium salt of p-toluene sulfinic acid, chlorobenzene sulfinic acid, zinc formaldehyde sulfoxylate, sodium bisulfite and sodium thiosulfate, agitating the resulting mixture to polymerize vinyl acetate, maintaining the polymerization temperature below 50° C. during the progress of the polymerization in the formation of polymer beads and recovering the resulting beads of polyvinyl acetate.

5. A process according to claim 4, wherein the vinyl acetate, water and dispersant are admixed and agitated to form an aqueous dispersion of said vinyl acetate and in which the catalyst promoter, organic peroxide and water-soluble reducing agent are added separately to said aqueous dispersion.

6. A process for preparing polyvinyl acetate in bead form which comprises admixing vinyl acetate, water in an amount of 30–800 parts per 100 parts of monomer, a dispersing agent in an amount of 0.005–0.2% by weight of monomer and water, and a catalyst system including 0.005–0.1 part of dicyclopentadienyliron per 100 parts of monomer, 0.01–1.0 part of an organic peroxide per 100 parts of monomer and 0.005–1.0 part of a water-soluble reducing agent selected from the group consisting of sodium formaldehyde sulfoxylate, sodium salt of p-toluene sulfinic acid, chlorobenzene sulfinic acid, zinc formaldehyde sulfoxylate, sodium bisulfite and sodium thiosulfate per 100 parts of monomer and agitating the resulting mixture to polymerize the vinyl acetate, maintaining the polymerization temperature below 50° C. during the progress of the polymerization in the formation of polymer beads, and recovering the resulting beads of polyvinyl acetate.

7. A process for preparing polyvinyl acetate in bead form which comprises admixing vinyl acetate monomer, water in amount of 30 to 800 parts per 100 parts of monomer, a dispersing agent in amount of 0.005 to 0.2% by weight of monomer and water, and a catalyst system including 0.005 to 0.10 part of dicyclopentadienyliron per 100 parts of monomer, 0.01 to 1.0 part of benzoyl peroxide per 100 parts of monomer, and 0.005 to 1.0 part of sodium formaldehyde sulfoxylate per 100 parts of monomer, and agitating the resulting mixture to polymerize the monomer, maintaining the polymerization temperature below 50° C. during the progress of the polymerization in the formation of polymer beads, and recovering the resulting bead of polyvinyl acetate.

References Cited in the file of this patent

UNITED STATES PATENTS

| | | |
|---|---|---|
| 2,462,354 | Brubaker et al. | Feb. 22, 1949 |
| 2,746,947 | Kominami et al. | May 22, 1956 |
| 2,817,674 | Graham et al. | Dec. 24, 1957 |

UNITED STATES PATENT OFFICE
CERTIFICATE OF CORRECTION

Patent No. 3,049,522  August 14, 1962

Arthur I. Lowell et al.

It is hereby certified that error appears in the above numbered patent requiring correction and that the said Letters Patent should read as corrected below.

Column 2, lines 44 and 45, for '"ferrocence"' read -- "ferrocene" --; column 3, line 55, for "mean" read -- meant --; line 66, for "totyl" read -- tolyl --; column 7, line 73, for "oxiding" read -- oxidizing --; column 9, line 59, for "in" read -- is --.

Signed and sealed this 11th day of June 1963.

(SEAL)
Attest:

ERNEST W. SWIDER
Attesting Officer

DAVID L. LADD
Commissioner of Patents